US010802968B2

(12) United States Patent
Biswas et al.

(10) Patent No.: US 10,802,968 B2
(45) Date of Patent: Oct. 13, 2020

(54) PROCESSOR TO MEMORY WITH COHERENCY BYPASS (71) Applicant: Apple Inc., Cupertino, CA (US)

(72) Inventors: Sukalpa Biswas, Fremont, CA (US); Harshavardhan Kaushikkar, San Jose, CA (US); Munetoshi Fukami, Newark, CA (US); Gurjeet S. Saund, Saratoga, CA (US); Manu Gulati, Saratoga, CA (US); Shinye Shiu, Los Altos, CA (US)

(73) Assignee: Apple Inc., Cupertino, CA (US)

(*) Notice: Subject to any disclaimer, the term of this patent is extended or adjusted under 35 U.S.C. 154(b) by 140 days.

(21) Appl. No.: 14/705,506

(22) Filed: May 6, 2015

(65) Prior Publication Data
US 2016/0328322 A1 Nov. 10, 2016

(51) Int. Cl.
G06F 12/0815 (2016.01)
G06F 12/0813 (2016.01)
G06F 9/52 (2006.01)

(52) U.S. Cl.
CPC .......... *G06F 12/0815* (2013.01); *G06F 9/528* (2013.01); *G06F 12/0813* (2013.01); *G06F 2212/1016* (2013.01); *G06F 2212/622* (2013.01)

(58) Field of Classification Search
CPC .................................................. G06F 12/0815
See application file for complete search history.

(56) References Cited

U.S. PATENT DOCUMENTS

| 7,234,029 | B2 | 6/2007 | Khare et al. | |
| 7,600,078 | B1* | 10/2009 | Cen | G06F 12/0862 |
| | | | | 711/137 |
| 2002/0087811 | A1* | 7/2002 | Khare | G06F 12/0817 |
| | | | | 711/146 |
| 2005/0198187 | A1* | 9/2005 | Tierney | G06F 12/0828 |
| | | | | 709/214 |
| 2009/0019239 | A1* | 1/2009 | Allison | G06F 13/1642 |
| | | | | 711/151 |
| 2009/0089510 | A1 | 4/2009 | Lee et al. | |
| 2012/0144126 | A1 | 6/2012 | Nimmala et al. | |
| 2014/0013047 | A1 | 1/2014 | Sawin et al. | |
| 2014/0089592 | A1* | 3/2014 | Biswas | G06F 12/0862 |
| | | | | 711/133 |
| 2015/0127922 | A1* | 5/2015 | Camp | G06F 12/0246 |
| | | | | 711/206 |

* cited by examiner

Primary Examiner — Larry T Mackall
Assistant Examiner — Michelle T Bechtold
(74) Attorney, Agent, or Firm — Kowert, Hood, Munyon, Rankin & Goetzel, P.C.

(57) ABSTRACT

An apparatus for processing memory requests from a functional unit in a computing system is disclosed. The apparatus may include an interface that may be configured to receive a request from the functional. Circuitry may be configured initiate a speculative read access command to a memory in response to a determination that the received request is a request for data from the memory. The circuitry may be further configured to determine, in parallel with the speculative read access, if the speculative read will result in an ordering or coherence violation.

18 Claims, 6 Drawing Sheets

PROCESSOR TO MEMORY WITH COHERENCY BYPASS

BACKGROUND

Technical Field

This invention relates to computing systems, and more particularly, processing memory access requests.

Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

To implement the desired functions on an SoC, one or more processors may be employed. Each processor may include a memory system with multiple levels of caches for providing low latency access to program instructions and operands. With multiple processors accessing multiple caches as well as main memory, the issue of cache coherency may arise. For example, a given data producer, such as, e.g., one of processors, may write a copy of data in a cache, but the update to main memory's copy of the data may be delayed. In write-through caches, a write operation may be dispatched to memory in response to the write to the cache line, but the write is delayed in time. In a writeback cache, writes are made in the cache and not reflected in memory until the updated cache block is replaced in the cache (and is written back to main memory in response to the replacement).

Because the updates have not been made to main memory at the time the updates are made in cache, a given data consumer, such as, e.g., another processor, may read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Maintaining cache coherency is increasingly challenging as various different types of memory requests referencing uncacheable and cacheable regions of the address space are processed by the processor(s).

SUMMARY OF THE EMBODIMENTS

Various embodiments for a circuit and method for processing a cache request are disclosed. Broadly speaking, an apparatus and method are contemplated in which an interface may be configured to receive a request from a processor. Circuitry may be configured to determine if the request is a request for data and, in response to the determination, initiate a speculative read access to a memory. The circuitry may be further configured to determine, in parallel with the speculative read access, if the speculative read access will result in an ordering or coherence violation.

In one embodiment, the circuitry may be further to cancel the read access command in response to a determination that the speculative read access will result in an ordering or coherence violation.

In a particular embodiment, the circuitry may be further configured to determine a number of pending speculative read accesses to the memory. In another non-limiting embodiment, the circuitry may be further configured to compare the number of pending speculative read accesses to the memory to a predetermined threshold value.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

To improve computational performance, a system-on-a-chip (SoC) may include multiple processors. Each processor may employ a local cache memory to provide rapid access to local copies of instructions and operands. In some cases, there may be multiple copies of an operand. For example, there may a copy of an operand in main memory in addition to a copy in each cache memory employed. When one of the copies of the operand is changed, the other copies must be updated as well. Maintaining consistency of data across the various memories is commonly referred to as maintaining "cache coherence."

To maintain coherence between main memory and various cache memories, requests may be sent to processors or other functional blocks within the SoC to perform certain tasks or provide certain data. Requests for data may be processed to determine if a cache memory of a given functional block includes the requested data, thereby eliminating the need to retrieve the requested data from main memory. Processing read requests in this fashion, however, can increase latency of some read requests to main memory while the various cache memories within the SoC are checked for the requested data. Such increases in latency may reduce overall system performance. The embodiments illustrated in the drawings and described below may provide techniques for speculatively issuing read accesses to main memory for certain read requests, while performing coherency checking in parallel, thereby reducing latency for certain main memory read requests.

System-on-a-Chip Overview

Figure 1:
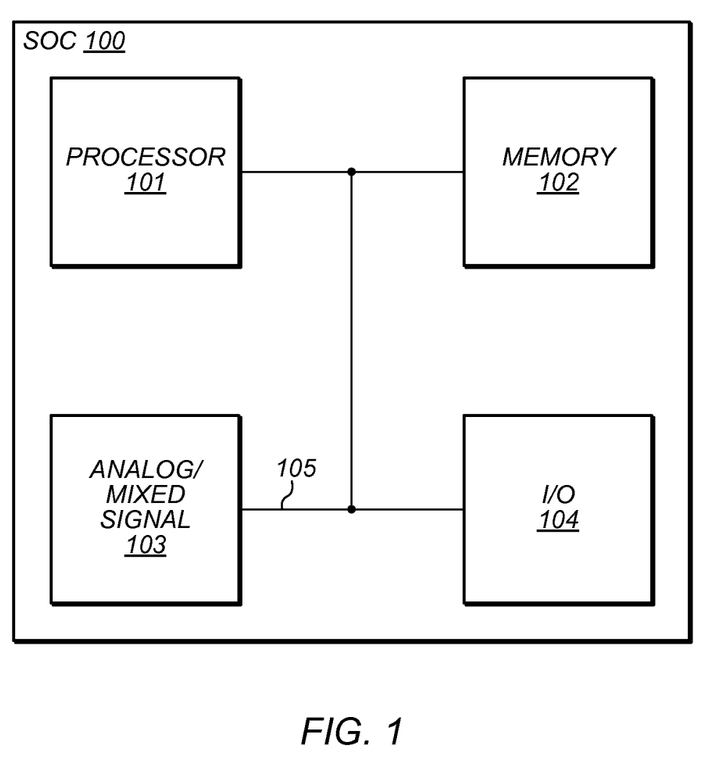
FIG. 1 illustrates an embodiment of a system-on-a-chip (SoC).

A block diagram of an SoC is illustrated in FIG. 1. In the illustrated embodiment, SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone. Transactions on internal bus 105 may be encoded according to one of various communication protocols. For example, transactions may be encoded using Peripheral Component Interconnect Express (PCIe®), or any other suitable communication protocol.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, Phase Change Memory (PCM), or a Ferroelectric Random Access Memory (FeRAM), for example. It is noted that in the embodiment of an SoC illustrated in FIG. 1, a single memory block is depicted. In other embodiments, any suitable number of memory blocks may be employed.

Processor 101 may, in various embodiments, be representative of a general-purpose processor that performs computational operations and executes program instructions retrieved from memory. For example, processor 101 may be a central processing unit (CPU) such as a microprocessor, a microcontroller, an application-specific integrated circuit (ASIC), or a field-programmable gate array (FPGA). In some embodiments, processor 101 may include multiple processor cores.

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with cellular telephone networks.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between SoC 100 and one or more devices (e.g., other computer systems or SoCs) coupled to SoC 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

Each of the functional blocks (also referred to herein as a "functional unit" or "agent") included in SoC 100 may be included in separate power and/or clock domains. In some embodiments, a functional block may be further divided into smaller power and/or clock domains. Each power and/or clock domain may, in some embodiments, be separately controlled thereby selectively deactivating (either by stopping a clock signal or disconnecting the power) individual functional blocks or portions thereof.

Figure 2:
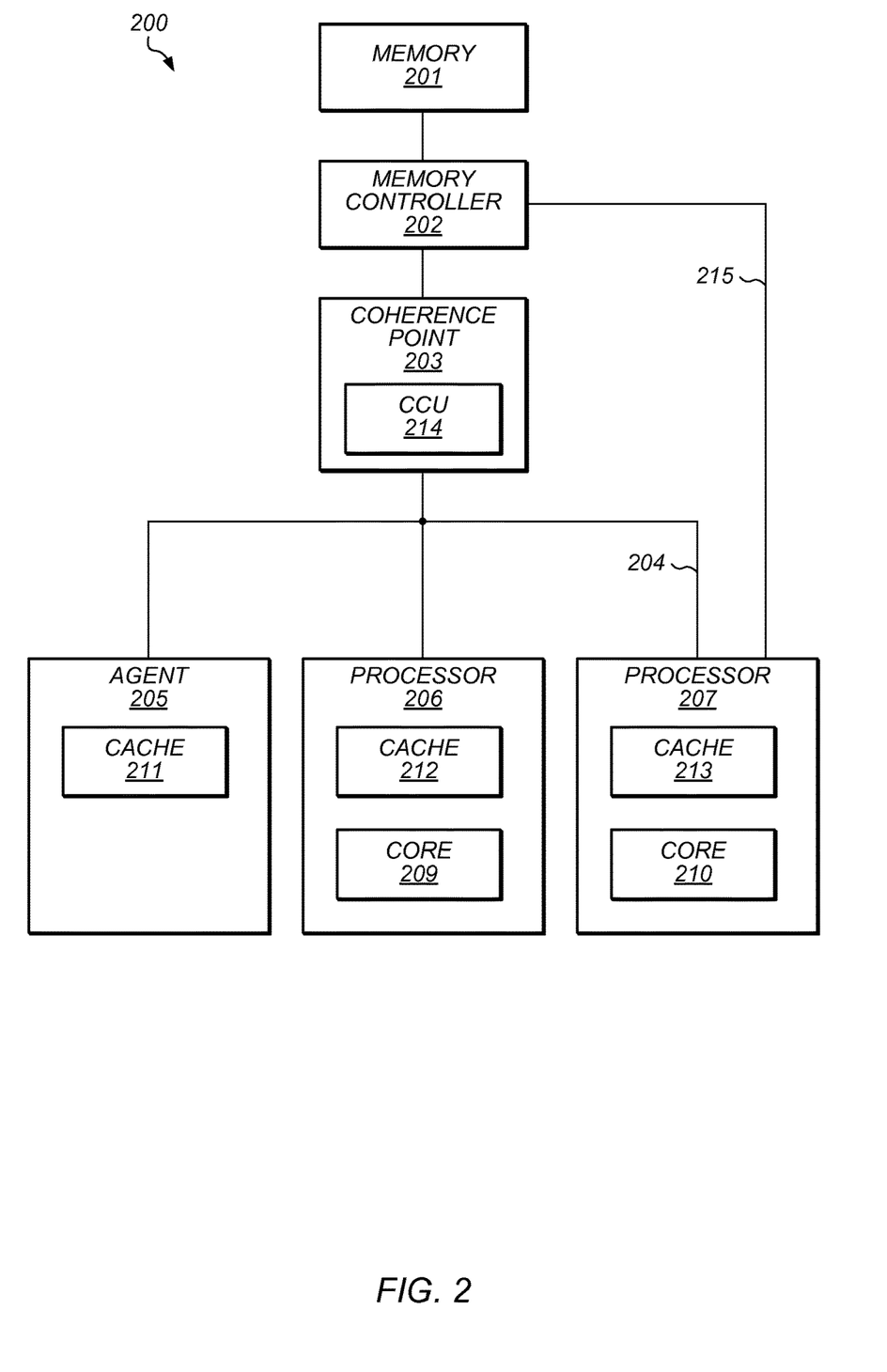
FIG. 2 illustrates another embodiment of an SoC.

Turning to FIG. 2, another embodiment of an SoC is depicted. In the illustrated embodiment, SoC 200 includes a memory 201, a memory controller 202, a coherence point circuit 203, agent 205, and processors 206, and 207. Agent 205 includes cache memory 211, and processor 206 includes processor core 209 and cache memory 212, and processor 207 includes processor core 210 and cache memory 213.

Each of agent 205 and processors 206, and 207 are coupled to coherence point circuit 203 via bus 204. It is noted that although only three functional units are depicted, in other embodiments, different numbers of processors as well as other functional blocks may be coupled to bus 204. Processor 207 is further coupled to memory controller 202 via bus 215. In some embodiments, bus 215 is dedicated for communication between processor 207 and memory controller 202, and may be used for processor 207 to transmit requests to memory controller 202, and for memory controller 202 to return data from memory 201 to processor 207.

Memory 201 may, in some embodiments, include one or more DRAMs, or other suitable memory device. Memory 201 is coupled to memory controller 202 which may be configured to generate control signals necessary to perform read and write operations to memory 201. In some embodiments, memory controller 202 may implement one of various communication protocols, such as, e.g., a synchronous double data rate (DDR) interface.

In some embodiments, coherence point unit 203 may include a coherence control unit (CCU) 214. CCU 214 may be configured to receive requests and responses (collectively referred to as "transactions") between agent 205, and processors 206, and 207, and memory 201. Each received transaction may be evaluated in order to maintain coherency across cache memories 211, 212, and 213, and memory 201. CCU 214 may maintain coherency using one of various coherency protocols such as, e.g., Modified Share Invalid (MSI) protocol, Modified Owned Exclusive Shared Invalid (MOESI) protocol, or any other suitable coherency protocol. Coherence point unit 203 may also receive requests processor 207 through memory controller 202. In some embodiments, by first sending memory requests to memory controller 202, the latency of some memory operations initiated by processor 207 may be reduced, thereby improving system performance.

Cache memories 211, 212, and 213 may be designed in accordance with one of various design styles. For example, in some embodiments, cache memories 211, 212, and 213 may be fully associative, while, in other embodiments, the memories may be direct-mapped. Each entry in the cache memories may include a "tag" (which may include a portion of the address of the actual data fetched from main memory).

It is noted that embodiment of an SoC illustrated in FIG. 2 is merely an example. In other embodiments, different numbers of processors and other functional blocks may be employed.

Bypass to Memory

Figure 3:
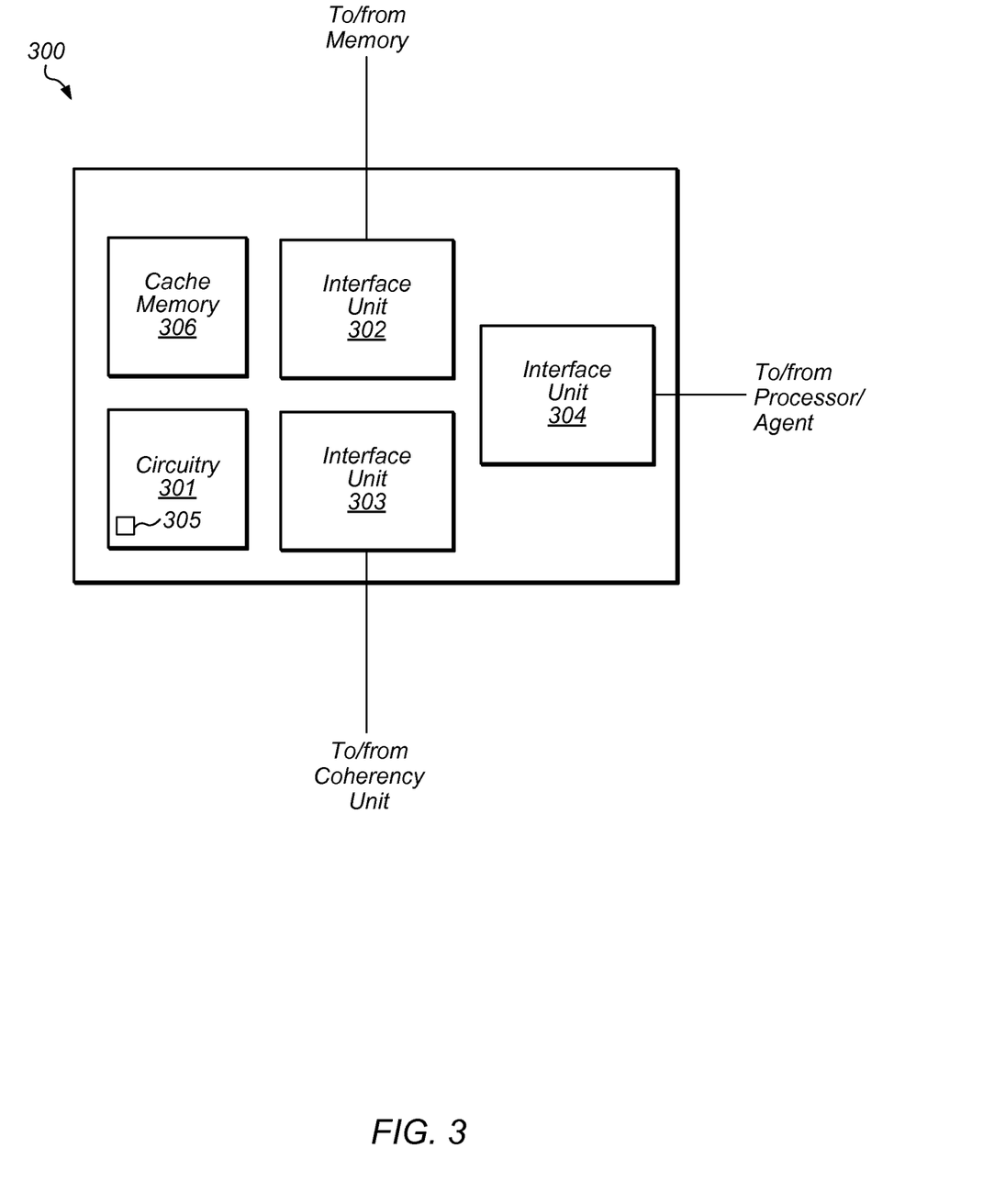
FIG. 3 illustrates an embodiment of a memory controller.

Turning to FIG. 3, an embodiment of a memory controller included in a computing system is illustrated. In some embodiments, memory controller 300 may correspond to memory controller 202 as illustrated in FIG. 2. In the illustrated embodiment, memory controller 300 includes circuitry 301, interface units 302 through 304, and cache memory 306.

Interface unit 302 may be configured to send and receive transactions (a transaction may include a request and corresponding response) with a memory, such as, memory 201 as illustrated in FIG. 2, for example. In some embodiments, interface unit 302 may be configured to encode and decode such transactions in accordance with a communication protocol employed by the memory. Interface unit 302 may also receive data and commands from circuitry 301 to be encoded and transmitted to memory 201. Additionally, interface unit 302 may send data extracted from a response by the memory to either interface unit 304 or 303 so that the extracted data may be forwarded onto a processor or other functional unit with the computing system.

In a similar fashion, interface unit 303 may be configured to send transactions to a coherency unit, such as, coherency unit 203, for example. Interface unit 304 may perform a similar function with a processor or agent, such as, processor 207, for example. Interface units 303 and 304 may each encode and decode transactions according to any communication protocol employed by the coherency unit and processor, respectively.

Each of interface units 302 through 304 may, in various embodiments, be implemented as a state machine, i.e., a combination of sequential logic elements, combinatorial logic gates, or any suitable combination thereof. In some embodiments, portions of the functionality described above in regard to the interface units may be performed by circuitry 301.

Cache memory 306 may be designed in accordance with one of various design styles. For example, in some embodiments, cache 306 may be fully associative. In other embodiments, cache memory 306 may be direct-mapped. Each entry in cache memory 306 may include a "tag" (which may include a portion of the address of the actual data fetched from main memory).

Circuitry 301 may be configured to examine requests received from a processor via interface unit 304 and determine if the request is a read request, i.e., a request for data stored in memory. In the case of a read request, circuitry 301 may generate a read access command to speculatively send to the memory via interface 302. Before transmitting the read access command to the memory, circuitry 301 may determine a number of pending read accesses to the memory. Circuitry 301 may also determine if there are ordering or coherence violations that would be created by transmitting the read access. In some embodiments, a counter, such as, e.g., counter 305, may be used to track a number of pending read accesses. Counter 305 may be incremented each time a new read access command is sent to the memory, and may be decremented when the memory returns data from a previously send read access command. Circuitry 301 may also relay or forward requests received via interface unit 304 to a coherency unit via interface 303.

Counters as described herein, may be a sequential logic circuit configured to cycle through a pre-determined set of logic states. A counter may include one or more state elements such as, e.g., flip-flop circuits, and may be designed according to one of various designs styles including asynchronous (ripple counters), synchronous counters, ring counters, and the like.

Circuitry 301 may, in various embodiments, be implemented as a state machine or any other suitable sequential logic circuit. In other embodiments, circuitry 301 may be implemented as a general-purpose processor configured to execute program instructions in order to perform various operations such as those described above.

The embodiment illustrated in FIG. 3 is merely an example. In other embodiments, different numbers of interface units, and related circuit units may be employed.

Figure 4:
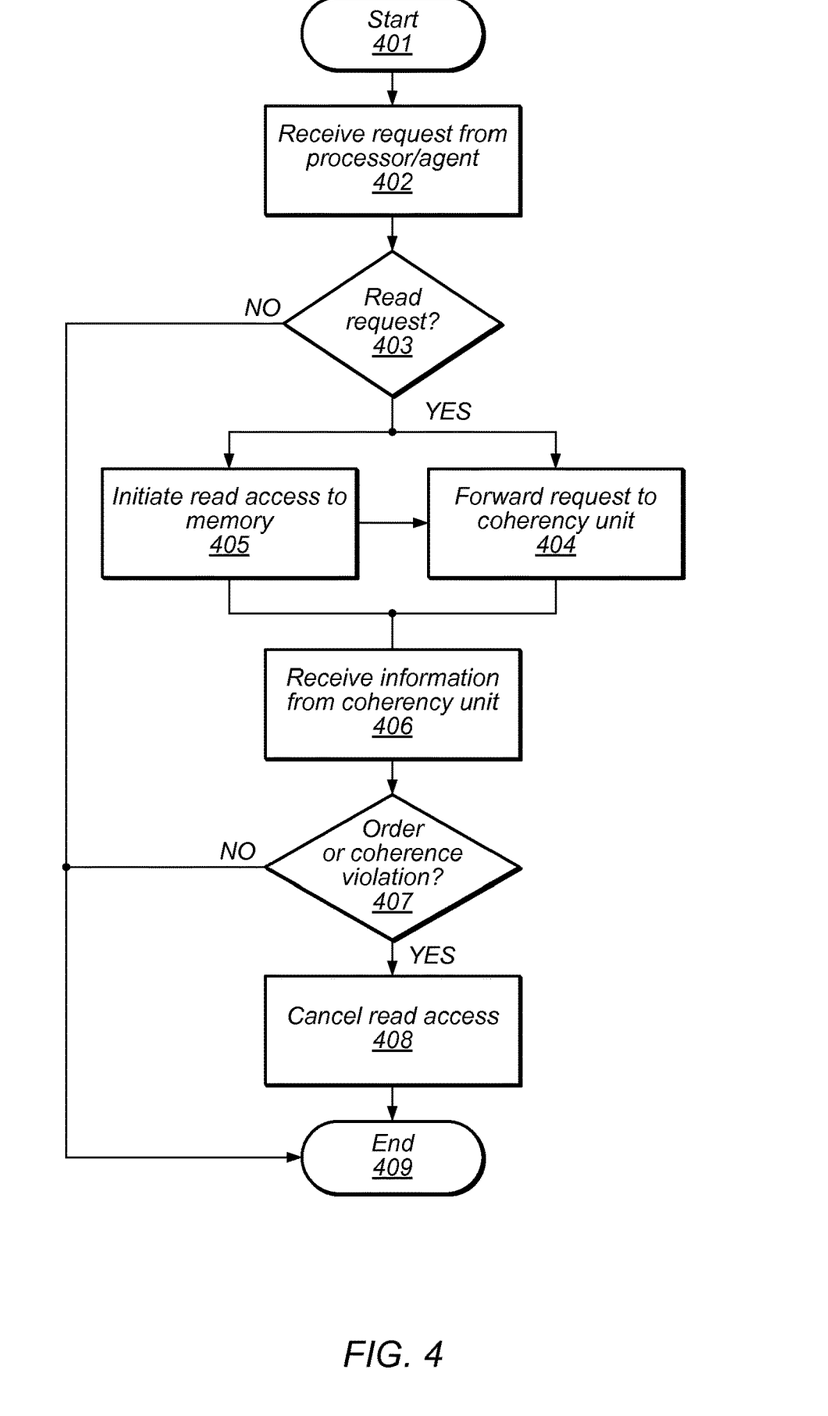
FIG. 4 depicts a flow diagram illustrating an embodiment of a method for operating a memory controller.

Turning to FIG. 4, a flow diagram depicting an embodiment of a method for operating a memory controller in a computing system is illustrated. Referring collectively to the embodiment illustrated in FIG. 2 and the flow diagram of FIG. 4, the method begins in block 401. Memory controller 202 may then receive a request from processor 207 (block 402). In some embodiments, an agent, such as, e.g., processor 207, may transmit the request to memory controller 202 via dedicated bus 215. Bus 215 may employ any suitable communication protocol to allow memory controller 202 and processor 207 to send requests and receive responses.

The method may then depend on the type of request sent by processor 207 (block 403). If the request is a write request, then the method may conclude in block 409. If, however, the request is a read request, then a speculative read access to memory 201 is initiated (block 405) and the original request is forwarded onto coherency unit 203 (block 404). Information indicating that a speculative read has been initiated may be sent to coherency unit 203 along with the original request. In some embodiments, the speculative read access may be performed in parallel with processing performed by coherency unit 203. As described below in more detail in regard to FIG. 5, initiating the read access to memory 201 may include encoding a command in accordance with a communication protocol, and transmitting the encoded command to memory 201.

Once memory controller 202 receives the request from processor 207, the request may be forwarded onto coherency unit 203 (block 403). Coherency unit 203 may, in various embodiments, receive other requests from other functional units within the computing system. Such requests may be sent coherency unit 203 via an internal bus (also referred to herein as a "switch fabric"). In the case of read requests, coherency unit 203 may begin to process the received request to determine if data requested in the read request is stored in a cache memory belonging to another functional unit, such as, agent 205, for example.

Once the read access to memory 201 has been initiated, and the request forwarded onto coherency unit 203, memory controller 202 may receive information from coherency unit 203 (block 406). In some embodiments, the received information may include the results of a check of other cache memories within the computing system to determine if the requested data is available. The pipeline depths of the memory controller 202 and coherency unit 203 may, in various embodiments, be designed such that coherency information is available to memory controller 202 in a timely fashion. That is, the coherency information may be sent to memory controller 202 before memory 201 completes the previously send read access.

The method may then depend on the received coherency information (block 407). Coherency unit 203 may use the information that a speculative read access has been initiated along with the forwarded request to gather information regarding possible violations resulting from the speculative access, and send this information to memory controller 202. The received coherency information may then be used to check for ordering or coherence violations. For example, if a write is already schedule to an address location specified in the speculative read access, reading the data stored at the address location before the write is complete may result in an ordering violation. Alternatively or additionally, if the speculative read access violates the coherence protocol employed by the computer system, a coherence violation may be detected.

If the received coherency information indicates that there are no ordering or coherence violations that would result from using data retrieved during the speculative read, then no further action is taken and the method may conclude in block 409. If, however, the coherency information indicates that an ordering or coherence violation will occur if the results from the speculative read are used, then memory controller 202 will cancel the speculative read access (block 408). In some embodiments, if all or a portion of requested data has been received from memory 201, any received data may be discarded. Coherency unit 203 may then transmit any command necessary to retrieve the desired data from the cache memory in the computer system, in which the data is located. The method may then conclude in block 409.

It is noted that the method illustrated in the flow diagram of FIG. 4 is merely an example. In other embodiments, different operations and different orders of operations are possible and contemplated.

Figure 5:
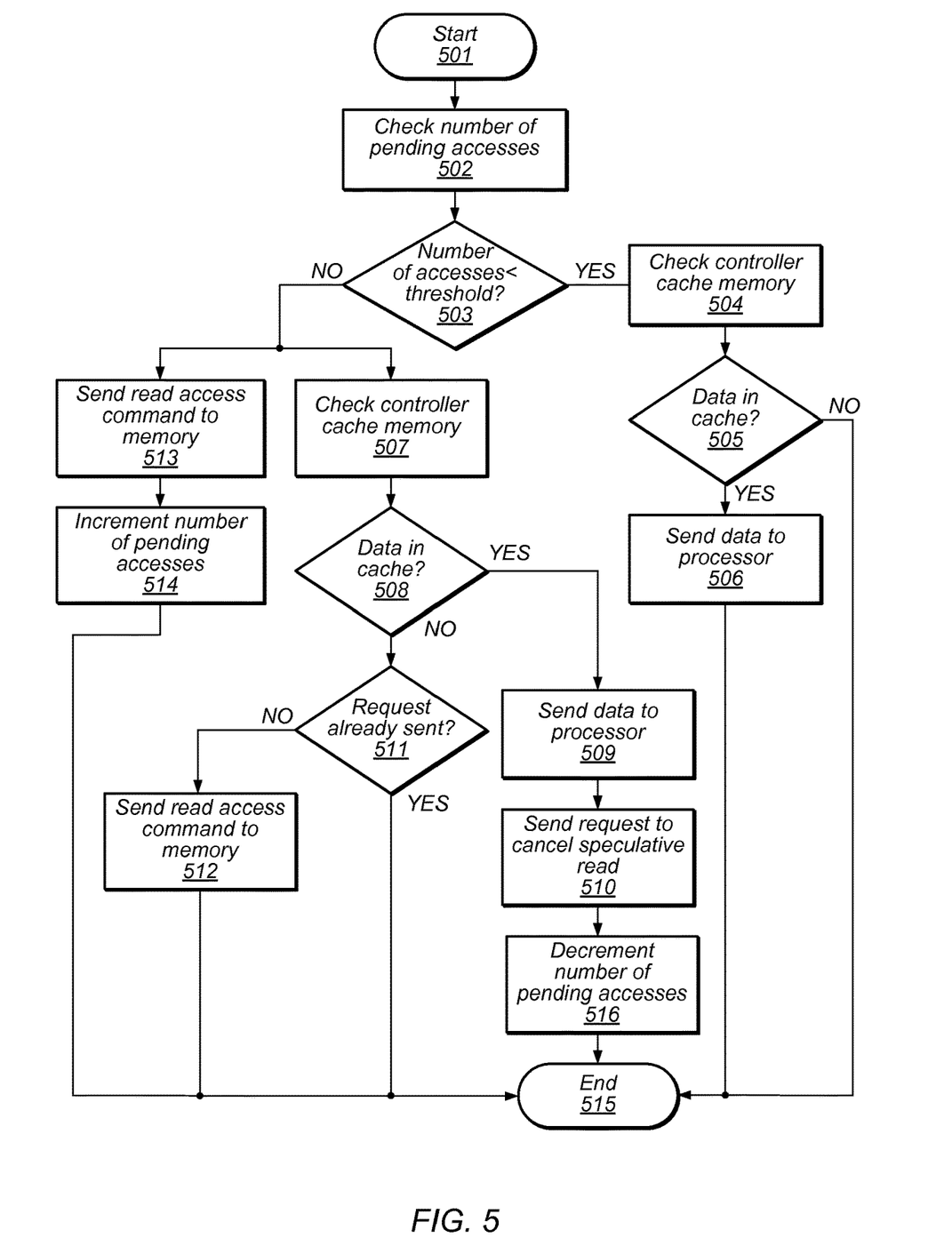
FIG. 5 depicts a flow diagram illustrating an embodiment of a method for submitting a memory access command to a memory.

A flow diagram depicting an embodiment of a method for submitting a memory access command to a memory is illustrated in FIG. 5. In various embodiments, the method illustrated in FIG. 5 may correspond to the operation of block 405 as depicted in FIG. 4. Referring collectively to the memory controller 300 as depicted in FIG. 3, and the flow diagram illustrated in FIG. 5, the method begins in block 501.

A number of pending read accesses to memory, such as memory 201 as illustrated in FIG. 2, is then checked (block 502). In various embodiments, the number of pending read accesses to the memory may be stored in a counter, such as, counter 305, for example. The number of pending read access may, in other embodiments, be stored in a register or other suitable memory (not shown) that may be read by circuitry 301. The method may then depend on the number of pending read accesses to the memory (block 503).

If the number of pending read accesses if less than a predetermined threshold, memory controller 300 may then check cache memory 306 for data specified in the request from an agent, such as, processor 207 as illustrated in FIG. 2, for example (block 504). In various embodiments, circuitry 301 may compare an address included in the request from the processor against a list of addresses (or "tags") indicating what data is stored in cache memory 306. The method may then depend on if the requested data is stored in cache memory 306 (block 505).

If the requested data is stored in cache memory 306, then memory controller 300 may retrieve the data from cache memory 306 and send the data to the processor (block 506). In some embodiments, the data may be sent via a dedicated bus, such as, e.g., bus 215 as illustrated in FIG. 2. Once the data has been sent to the processor, the method may conclude in block 508. If, however, the requested data is not stored in cache memory 306, then the method may end in block 515.

If the number of pending read access is greater than or equal to the predetermined threshold, multiple sets of operations are then performed in parallel. One set of parallel operations includes sending a read access command to the memory (block 513). In some embodiments, the read access command may be formatted to interface unit 302 to conform to the interface of the memory. For example, the read request from the processor may converted to a memory access command that conforms to the Double Data Rate (DDR) DRAM interface standard, or any other suitable interface standard.

Once the read access command has been send to the memory, the number of pending read accesses may then be incremented (block 514). In some embodiments, a counter, such as, counter 305 may be incremented, while, in other embodiments, a value corresponding to the number of pending read accesses may be read from a register or other suitable memory, updated, and re-written into the register. With the update of the number of pending read accesses complete, the method may conclude in block 515.

The other set of parallel operations begins with memory controller 300 checking cache memory 306 for data for the requested data (block 507). The method may then depend on if the requested data is stored in cache memory 306 (block 508). If the data is available in cache memory 306, memory controller 300 may send the data to the processor or agent (block 509). Since the data was available in cache memory 306, the speculative read access is then cancelled (block 510). With the cancellation of the speculative read access, the number of pending read accesses is then decremented (block 516). The method may then conclude in block 515.

If, however, the requested data is not available in cache memory 306, the method may then depend on if the speculative request has already been sent to the memory (block 511). If the request has already been sent, then the method may conclude in block 515. Alternatively, if the request has yet to be sent, then the request is sent to the memory (block 512) in a similar fashion as described above in regard to block 513. The method may conclude in block 515.

Although the operations illustrated in FIG. 5 are depicted as being performed in a sequential fashion, in other embodiments, one or more of the operations may be performed in parallel.

Figure 6:
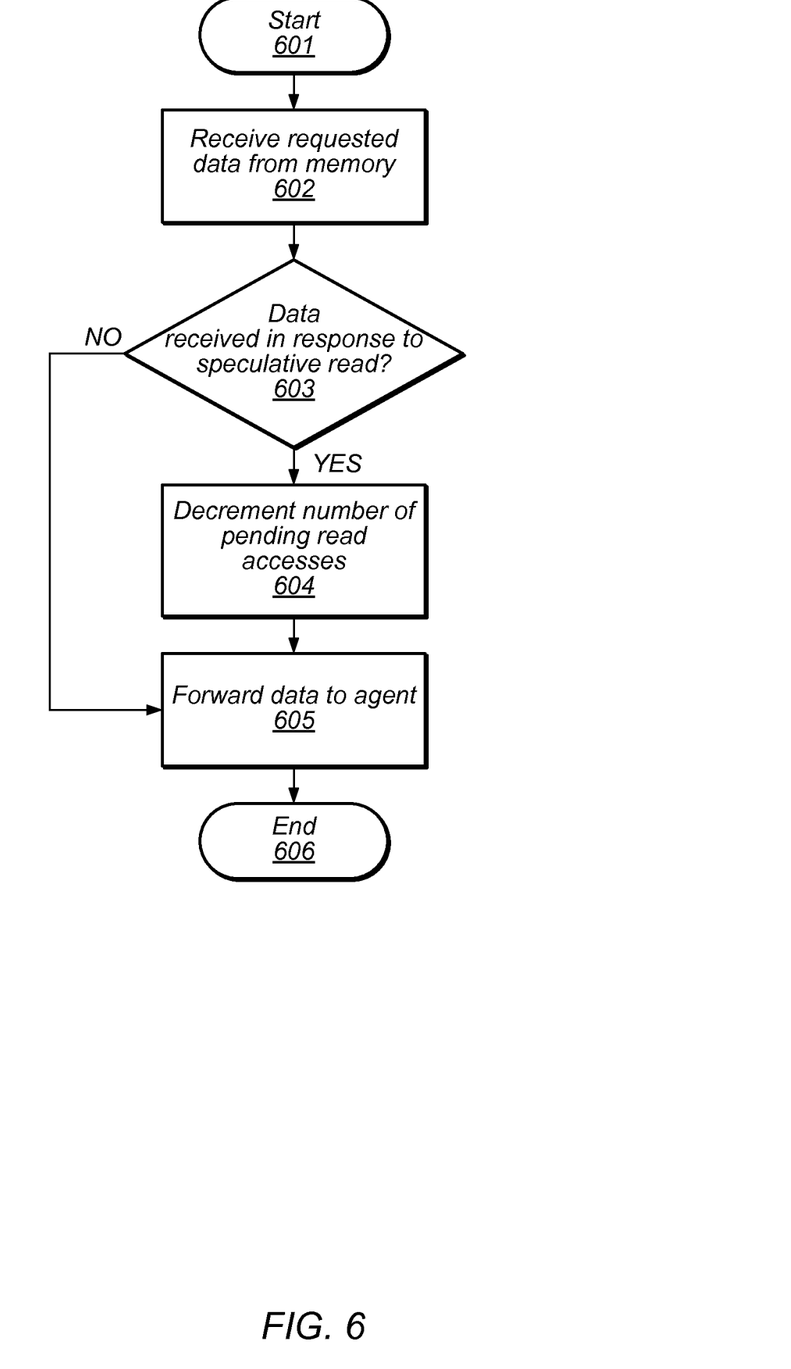
FIG. 6 depicts a flow diagram illustrating an embodiment of a method for receiving data from a memory.

Turning to FIG. 6, a flow diagram illustrating an embodiment of a method for receiving data from a memory is depicted. Referring collectively to the embodiment of an SoC depicted in FIG. 2, and the flow diagram illustrated in FIG. 6, the method begins in block 601. Memory controller 202 may then receive data from memory 201 (block 602). In some embodiments, the data received may be in response to a memory access command previously sent from memory controller 202 to memory 201. The memory access command may have been sent in response to a request from processor 207, or other coherent agent, as described above in more detail in regard to FIG. 4. The method may then depend on if the data was received in response to a speculative read (block 603).

If the memory controller 202 received the data in response to a speculative read, then memory controller 202 may decrement a number of pending read accesses for memory 201 (block 604). In some embodiments, circuitry, such as, e.g., circuitry 301 as illustrated may decrement a counter in response to receiving the data from memory 201. A value in a register or other suitable local memory for memory controller 201 may, in other embodiments, be used to store the number of pending read accesses for memory 201. The value may be read and updated by circuitry included in memory controller 202.

The received data may then be forwarded onto the requesting coherent agent via bus 215 (block 605). In various embodiments, bus 215 may be a dedicated connection between the coherent agent, such as, e.g., processor 207, and memory controller 202 that allows for the transfer of requests and data between the coherent agent and memory controller 202. Bus 215 may implement any one of various communication protocols for the transfer of the requests and data. For example, memory controller 202 may signal processor 207 that previously requested data is ready for transmission. In response to such a signal, processor 207 may acknowledge the signal and prepare to receive the data. Upon successful receipt of the data from memory controller 202, processor 207 may send another acknowledgement message. Once processor 207 has successfully received the data, the method may conclude in block 606.

Alternatively, if the data received by memory controller 202 was not received in response to a speculative read, the method may then proceed from block 605 as described above. It is noted that the embodiment of the method for receiving data from a memory depicted in FIG. 6 is merely an example. In other embodiments, different operations and different orders of operations are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A memory controller comprising:
a cache memory;
a first interface unit coupled to a particular functional unit of a plurality of functional units via a first dedicated bus, wherein the first interface unit is configured to receive a request from the functional unit via the first dedicated bus;
a second interface unit coupled to the coherency unit via a second dedicated bus, wherein the second interface unit is configured to receive information indicative of one or more locations in which particular data associated with the request from the functional unit is stored, wherein the coherency unit is configured to determine whether particular data included in a particular request belongs to a given functional unit of the plurality of functional units;
a third interface unit coupled to a memory circuit via a third dedicated bus; and
circuitry coupled to the first interface unit and the second interface unit, wherein the circuitry is, in response to a determination that the request includes a request for data, configured to:
determine a number of pending read access requests to the memory circuit;
in response to a determination that the number of pending read access requests to the memory circuit is greater than a threshold value:
initiate a speculative read access to the memory circuit via the third dedicated bus;
forward, in parallel with initiating the speculative read access, the request to the coherency unit via the second dedicated bus; and
determine, in parallel with performing the speculative read access, if the speculative read access will result in an ordering or coherence violation based in part on information received from the coherency unit via the second dedicated bus;
otherwise, in response to a determination that the number of pending read access requests to the memory circuit is not greater than the threshold value, check the cache memory for the data.

2. The memory controller of claim 1, wherein the circuitry is further configured to cancel the speculative read access in response to a determination that the speculative read access will result in an ordering violation or a coherence violation.

3. The memory controller of claim 1, wherein to initiate the speculative read access to the memory circuit, the circuitry is further configured to increment the number of pending read requests to the memory circuit.

4. The memory controller of claim 1, wherein the circuitry is further configured to cancel the speculative read access to the memory circuit in response to a determination that the data is stored in the cache memory.

5. The memory controller of claim 4, wherein the circuitry is further configured to decrement the number of pending read requests to the memory circuit in response to a determination that the speculative read access has been canceled.

6. The memory controller of claim 1, wherein the circuitry is further configured to receive the data from the memory circuit in response to a completion of the speculative read access to the memory circuit and the first interface unit is further configured to forward the data to the particular functional unit via the first dedicated bus.

7. A method for operating a memory controller, the method comprising:
receiving a request from a functional unit via a first dedicated bus between the functional unit and the memory controller that bypasses a coherency unit;
in response to determining that the request is a request for data from a memory circuit:
determining, based on a number of pending read access requests to the memory circuit, whether to perform a speculative read access for the data or to check a cache memory included in the memory controller for the data;
in response to determining that the number of pending read access requests to the memory circuit is greater than a threshold value:
initiating the speculative read access to the memory circuit via a second dedicated bus between the memory controller and the memory circuit;
forwarding, in parallel with initiating the speculative read access, the request to the coherency unit via a third dedicated bus between the memory controller and the coherency unit; and
determining, in parallel with performing the speculative read access, if the speculative read access will result in an ordering or coherence violation based in part on information received from the coherency unit, wherein the information is indicative of one or more locations in which the data is stored;
in response to the memory circuit completing a previous access request from the function unit:
receiving second data associated with the previous access request from the memory circuit; and
in response to determining that the previous access request was performed speculatively, sending a signal to the functional unit and forwarding the second data via the first dedicated bus to the functional unit upon receiving an acknowledgement to the signal from the functional unit indicating that the functional unit is prepared to receive the second data via the first dedicated bus.

8. The method of claim 7, further comprising canceling the speculative read access in response to determining that the speculative read access will result in an ordering violation or a coherence violation.

9. The method of claim 7, wherein initiating the speculative read access to the memory circuit includes incrementing the number of pending read requests to the memory circuit.

10. The method of claim 7, further comprising canceling the speculative read access to the memory circuit in response to determining that the data is stored in the cache memory included in the memory controller.

11. The method of claim 10, further comprising decrementing the number of pending read requests in response to determining the speculative read access has been canceled.

12. The method of claim 7, further comprising:
receiving data from the memory circuit in response to a completion of the speculative read access; and
forwarding the data to the function unit via the first dedicated bus.

13. An apparatus, comprising:
a coherency unit configured to determine whether given data included in a particular request belongs to a given processor of a plurality of processors;
a memory controller coupled to the coherency unit and a memory circuit, wherein the memory controller includes a cache memory; and
a particular processor coupled to the coherency unit via a first dedicated bus and coupled to the memory controller by a second dedicated bus, wherein the particular processor is configured to send an access request to the memory controller via the second dedicated bus bypassing the coherency unit;
wherein the memory controller is configured to:
in response to a determination that the access request includes a request for data from the memory circuit:
determine a number of pending read access requests to the memory circuit;
in response to a determination that the number of pending read access requests to the memory circuit is greater than a threshold value:
initiate a speculative read request for the data from the memory circuit via a third dedicated bus; and
forward, in parallel with initiating the speculative read request, the access request to the coherency unit;
otherwise, in response to a determination that the number of pending read access requests to the memory circuit is not greater than the threshold value, check the cache memory for the data;
wherein the coherency unit is configured to send results of a coherency evaluation of the access request to the memory controller; and
wherein the memory controller is further configured to cancel the speculative read access based on the results.

14. The apparatus of claim 13, wherein the memory controller is coupled to the coherency unit via a fourth dedicated bus, and wherein the memory controller is further configured to:
receive information from the coherency unit via the fourth dedicated bus; and
cancel the speculative read access responsive to a determination that the information indicates that the speculative read access will result in an ordering or coherence violation.

15. The apparatus of claim 13, wherein to initiate the speculative read access, the memory controller is further configured to increment the number of pending read access requests to the memory circuit.

16. The apparatus of claim 13, wherein the memory controller is further configured to cancel the speculative read access to the memory circuit in response to a determination that the data is stored in the cache memory.

17. The apparatus of claim 13, wherein the memory controller is further configured to decrement the number of pending read access requests to the memory circuit in response to a determination that the speculative read access has been canceled.

18. The apparatus of claim 13, wherein the memory controller is further configured to:
receive the data from the memory circuit in response to a completion of the speculative read access; and
forward the data to the particular processor via the first dedicated bus.

* * * * *